United States Patent [19]

Pauletti et al.

[11] 4,149,361
[45] Apr. 17, 1979

[54] CROP STUBBLE MASHER FOR HARVESTING MACHINE

[75] Inventors: Robert E. Pauletti, Davenport, Iowa; Glen W. Rohweder, Moline, Ill.

[73] Assignee: Deere & Company, Moline, Ill.

[21] Appl. No.: 778,976

[22] Filed: Mar. 18, 1977

[51] Int. Cl.² .......................................... A01D 45/02
[52] U.S. Cl. ........................................ 56/105; 56/1
[58] Field of Search .................. 56/98, 105, 106, 14.1, 56/14.2, 1; 280/12 R, 28.5

[56] References Cited

U.S. PATENT DOCUMENTS

| | | | |
|---|---|---|---|
| 2,915,870 | 12/1959 | Hume | 56/208 |
| 3,196,599 | 7/1965 | Meiners et al. | 56/10.2 |
| 3,698,164 | 10/1972 | Boone et al. | 56/208 |
| 3,808,783 | 5/1974 | Sutherland et al. | 56/106 |

*Primary Examiner*—Russell R. Kinsey

[57] ABSTRACT

A self-propelled combine has a pair of forward drive wheels and carries a forward, transversely elongated, harvesting header having a plurality of generally fore and aft passages adapted to receive respective rows of crop material as the machine advances and a cutting apparatus for each passage for severing the crop relatively close to the ground as it moves along the passage to leave a short upright crop stubble in each row. Two of the passages are in general fore and aft alignment with the respective drive wheels so that the wheels run over the stubble, and a pair of stubble mashing devices are mounted on the header forwardly of the respective drive wheels, each device including a skidlike stubble engaging element that is biased downwardly into contact with the ground so that it mashes the crop stubble against the ground in advance of the wheel to reduce tire wear caused by the wheel rolling over the upright stubble.

10 Claims, 3 Drawing Figures

CROP STUBBLE MASHER FOR HARVESTING MACHINE

BACKGROUND OF THE INVENTION

This invention relates to a self-propelled harvesting machine, such as a combine or the like, and more particularly to a harvesting machine having a forward header that is adapted to remove crop material from a field as the machine advances, leaving a relatively short upright crop stubble in the field. Such a header is shown in U.S. Pat. No. 3,982,384, also assigned to the assignee herein. The row crop header that is shown in said patent includes a plurality of independent row units that are mounted on the header frame for independent vertical floating adjustment, so that the row units are free to follow the contour of the ground. Each row unit includes a fore and aft passage adapted to receive a row of crop material as the machine advances, a cutting apparatus adapted to sever the crop from the field relatively close to the ground as it moves rearwardly along the passage and a conveyor for conveying the severed crop rearwardly along the passage to a crop converging auger that feeds crop material rearwardly through a feeder housing to a crop treating mechanism in the combine. the weight of each row unit is partially counterbalanced by a spring and the rest of the weight is supported on the ground by a pair of ground-engaging shoes that slide along the ground on opposite sides of each row.

While with the forward drive wheels of the combine preferably run between the rows, with certain size combines and with certain row spacings it is necessary that one or both of the drive wheels drive on top of a row, rolling over the stubble left in the row. With the trend for narrower row spacings and larger high floatation tires, the possibility of avoiding running on a row is reduced.

One of the features of the row crop header shown in said U.S. Pat. No. 3,982,384 is the ability of the individual row units to sever the crop in each row very close to the ground, which, in the case of crops such as soybeans, is highly desirable to reduce harvest losses. However, the relatively short crop stubble stands upright and when the drive wheels roll over the short upright stubble, which in many cases is quite rigid, the stubble penetrates the tire, rather than being deflected or bent over by the rolling tire as it would be in the case of a longer stubble. While the stubble does not puncture the tire, the numerous penetrations into the tire thread causes rapid wear of the tire. As is well known, the large tires on modern combines or the like are very expensive, so that the accelerated tire wear significantly increases the cost of operating the machine.

SUMMARY OF THE INVENTION

According to the present invention, an attachment is provided for a harvesting machine for mashing down the crop stubble in advance of the machine wheels to reduce the penetration of the stubble into the machine's tires and thereby prolong the life of the tires.

An important feature of the invention resides in the simple and economic construction of the attachment which can be provided on new machines as an option or easily attached to machines already in the field.

Another feature of the invention resides in the use of a leaf spring to bias a crop engaging element downwardly against the crop stubble with sufficient force to crush the stubble.

Still another feature of the invention resides in the provision for adjustable stop means for limiting the lowermost position of the crop stubble engaging element so that the element can be raised out of the way when the machine is being transported or when the stubble mashing feature is not necessary.

DESCRIPTION OF THE PREFERRED EMBODIMENT

Figure 1:
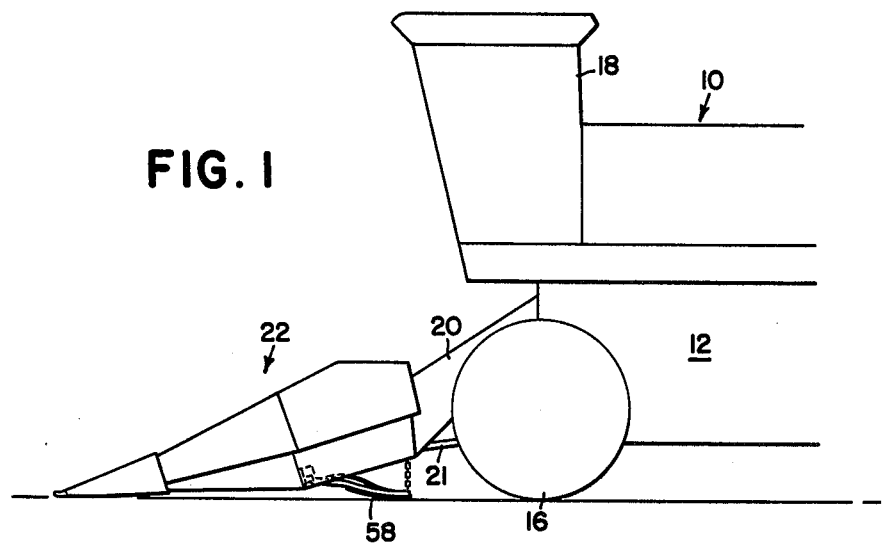
FIG. 1 is a schematic side elevational view of the forward portion of a combine equipped with a row crop header embodying the invention.
Figure 2:
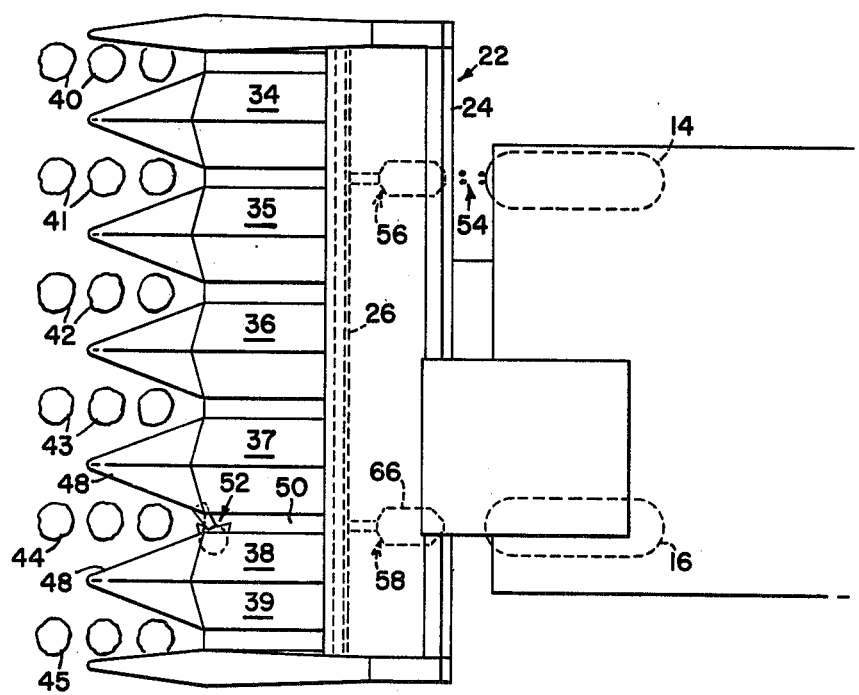
FIG. 2 is a schematic plan view of the combine and header shown in FIG. 1.

The invention is embodied in a self-propelled combine, indicated generally by the numeral 10, only the forward portion of the combine being shown in the drawings. As is well known the combine has a main separator body 12 mounted on a pair of forward laterally spaced drive wheels 14 and 16 and a forward elevated operator's station 18. The combine body has a forward crop inlet in communication with the rearward end of a forwardly extending feeder housing 20 that has its rearward end pivotally connected to the combine body 12 for vertical adjustment by means of a hydraulic cylinder 21 extending between the body and the feeder housing.

Mounted on the forward end of the feeder housing 20 is a transversely elongated header indicated generally by the numeral 22, the header being adapted to remove crop material from the field and deliver it to the feeder housing 20, wich has a conveying mechanism for moving the crop material into a conventional crop treating mechanism in the combine body. The heater has a rigid transversely elongated frame 24 that includes a transverse beam 26 that spans the width of the header below the forward edge of a header floor 28. The header floor extends rearwardly to an upright rear wall 30, and a transverse crop converging auger 32 extends between the opposite sides of the header immediately above the floor for converging the crop toward the center of the header where it is discharged through an opening in the rear wall 30 that registers with the forward inlet end of the feeder housing 20.

Figure 3:
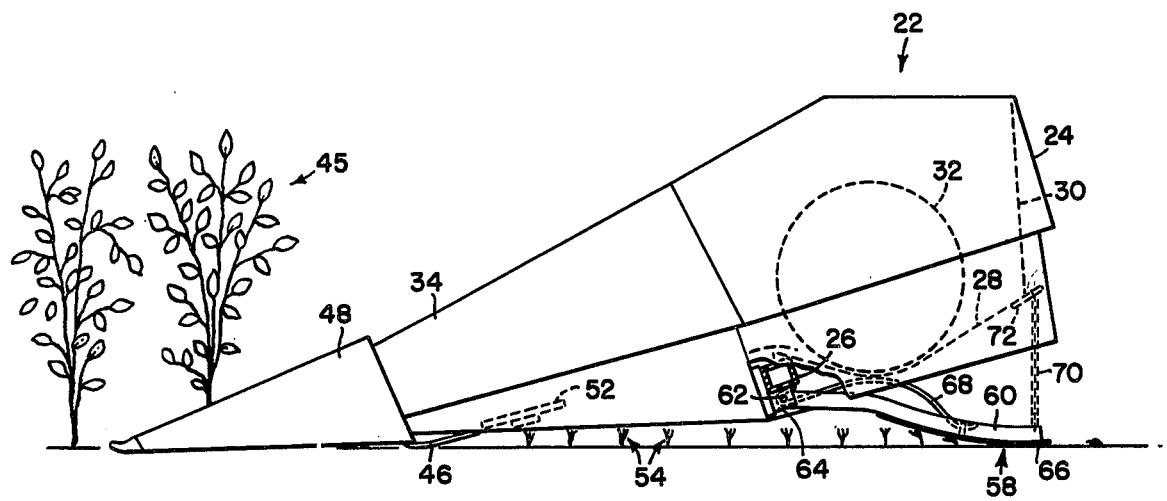
FIG. 3 is an enlarged side elevation view of the header showing the stubble mashing attachment mounted thereon.

A plurality of row units 34, 35, 36, 37, 38, and 39 are mounted side by side on the header frame 24 for independent vertical adjustment of the respective row units, and the row units are respectively adapted to receive adjacent rows of crop material indicated by the numerals 40, 41, 42, 43, 44, and 45 respectively. The construction of the header 22 and of the individual row units is described in greater detail in said U.S. Pat. No. 3,982,384, and are not shown or described in detail herein, although to further the understanding of the present invention some of the components of one of the row units are schematically shown in the drawings and described herein. As is apparent, each row unit extends forwardly from the transverse beam 26, the rearward end of the row unit being pivotally mounted to the header frame, with part of the weight of the forward end of the row unit being supported on a ground engaging shoe 46 that rides between the adjacent rows, so that each row unit is independently vertically swingable to follow the contour of the ground. Each row unit includes a pair of rearwardly converging gathering members 48 that direct the crop material in a fore and aft passage 50, and a cutting apparatus 52 is mounted at the forward end of each passage 50 relatively close to the ground so that crop material is severed close to the ground as it moves into the passage 50. A conveying device (not shown) is provided for moving the crop material rearwardly along the passage and depositing the crop material on the floor 28 immediately in front of the auger 32, which converges the crop as previously described. As the cutting apparatus 52 severs the crop material from the field it leaves a relatively short upright stubble, indicated by the numeral 54 in FIG. 3.

Suspended from the underside of the header are a pair of stubble mashing attachments 56 and 58 that are respectively in alignment with the passages 50 for the row units 35 and 38 for crushing the stubble 54 left in the rows 41 and 44 respectively. As is apparent, in the illustrated embodiment, the attachments 56 and 58 are respective forwardly of and in fore and aft alignment with the drive wheels 14 and 16, which run on top of the rows 41 and 44 respectively. In some machines, the spacing between the rows and the wheels 14 and 16 and the tire sizes for the wheels are such that only one of the wheels would be in fore and aft alignment with a crop row, in which case only a single stubble mashing attachment would be necessary.

Since the attachments 56 and 58 are identical, only the left hand attachment 58 will be shown and described in detail. The attachment 58 includes a rearwardly extending arm 60 that is mounted on a transverse pivot 62 at its forward end, the pivot 62 being carried by a bracket 64 attached to the underside of the beam 26. A pan-like shoe or stubble engaging element 66 is mounted on the underside of the rearward end of the arm 60. As is apparent, the pan-like element is slightly wider than the passsageway for the row unit with which it is aligned and is almost the width of the tire of the wheel with which it is aligned, the shoe or stubble engaging element being somewhat arcuate so that its leading edge is above the ground while its central portion rides along the ground. A leaf spring 68 has its forward end attached to the beam 26 above the arm 60 while its rearward end is connected to the arm 60 above the shoe 66, the spring 68 biasing the arm and consequently the shoe downwardly. A chain 70 extends upwardly from the rearward end of the arm 60 to a chain attaching bracket 72 on the header frame 24 at the bottom of the rear wall 30. The chain 70 limits the downward swinging movement of the arm 60 and the chain attachment bracket 72 has provision for connecting different links of the chain to the bracket to vary the effective length of the chain and thereby the lowermost position of the arm 60.

In operation, as the machine advances, the respective header row units 34–39 receive the respective rows of crop material 40 to 45, severing the crop material from the field relatively close to the ground to leave a short upright stubble 54, which, particularly in dry weather, is relatively rigid. The chain 70 is adjusted so that it is sufficiently long to permit the stubble mashing attachment shoe 66 to ride along the ground on top of the row. Preferably, the leaf spring 68 is selected and adjusted so that approximately 80 pounds of downward force is applied to the shoe 66 when the header is in normal operating position. Since the shoe 66 is arcuate, the stubble is bent forwardly as it passes under the shoe, and the downward force on the shoe is sufficient to mash or break th stubble so that it does not penetrate the tire immediately to the rear of the stubble mashing attachment.

Since the attachment arm 60 will swing downwardly as far as the chain 70 permits and a certain amount of downward movement is desirable from the normal position of the arm to permit the stubble engaging element to follow the contour of the ground, the shoe hangs below the header when the header is raised. If desired, to reduce the height that the header must be raised for transport without dragging the stubble mashing attachment along the ground, the effective length of the chain 70 can be shortened by simply retracting the cylinder 21 so that the header is in its lowermost position and reconnecting the chain 70 to its attachment bracket 72 in a shortened position, so that the arm will no longer swing downwardly as the header is raised.

We claim:

1. In a harvesting machine having a mobile main frame partially supported on a pair of laterally spaced wheels and carrying a forward transversely elongated harvesting header having a header frame and a plurality of row units respectively mounted side by side on the frame for independent floating adjustment, each row unit having a fore and aft passage adapted to receive a row of standing crop material as the machine advances, a cutting means for severing crop material from the standing crop, ground-engaging shoe means forwardly of the cutting means for supporting the forward end of the row unit on the ground and means for conveying the severed crop material rearwardly on the header, leaving upright crop stubble rooted to the ground, the passage for at least one of said row units being forwardly of and aligned with one of said wheels so that the wheel would ride over the stubble, the improvement comprising; a stubble engaging element; a mounting means operatively mounting the stubble engaging element on one of said frames for vertical adjustment relative to the frame rearwardly of the row unit leaving the stubble in advance of said one wheel in fore and aft alignment with the passage for said row unit; and means operative between said frame and the stubble engaging elements for biasing the stubble engaging element downwardly into contact with the ground and the crop stubble attached thereto in advance of said one wheel with sufficient force that the crop engaging element mashes down the upright stubble before the wheel rolls over the stubble.

2. The invention defined in claim 1 wherein the stubble engaging element comprises a generally horizontal pan-like member having an upwardly and forwardly inclined forward portion.

3. The invention defined in claim 2 wherein the stubble engaging element has approximately the same width as the passage of said row unit.

4. The invention defined in claim 1 wherein the mounting means includes a generally fore and aft arm pivotally connected to the header frame and extending rearwardly therefrom for swinging in a vertical arc.

5. The invention defined in claim 4 and including adjustable stop means operatively connected to the frame and the stubble engaging element for limiting the lowermost position of the stubble engaging element.

6. The invention defined in claim 4 wherein the means biasing the stubble engaging element downwardly comprises a flat spring having one end connected to the header frame and its other end connected to the arm.

7. The invention defined in claim 6 wherein the passages for two of said row units are located forwardly of the respective wheels and a pair of stubble engaging elements and mounting means therefor are provided to mount the respective stubble engaging elements in front of the respective wheels.

8. The invention defined in claim 6 wherein each stubble engaging element comprises a generally horizontal pan-like member having an upward and forwardly inclined forward portion.

9. The invention defined in claim 1 wherein the means biasing the stubble engaging element downwardly comprises a flat spring having one end connected to the header frame and its other end connected to the arm.

10. The invention defined in claim 9 and including adjustable stop means operatively connected to the frame and the stubble engaging element for limiting the lowermost position of the stubble engaging element.

* * * * *